Jan. 7, 1958  W. L. BOND  2,819,405
AUTOMATIC RECORDING DIFFRACTOMETER AND PLOTTER
Filed March 26, 1954  4 Sheets-Sheet 1

INVENTOR
W. L. BOND
BY
*H. O. Wright*
ATTORNEY

Jan. 7, 1958  W. L. BOND  2,819,405
AUTOMATIC RECORDING DIFFRACTOMETER AND PLOTTER
Filed March 26, 1954  4 Sheets-Sheet 2

INVENTOR
W. L. BOND
BY
H. O. Wright
ATTORNEY

Jan. 7, 1958 W. L. BOND 2,819,405
AUTOMATIC RECORDING DIFFRACTOMETER AND PLOTTER
Filed March 26, 1954 4 Sheets-Sheet 3

INVENTOR
W. L. BOND
BY
H. O. Wright
ATTORNEY

Jan. 7, 1958  W. L. BOND  2,819,405
AUTOMATIC RECORDING DIFFRACTOMETER AND PLOTTER
Filed March 26, 1954  4 Sheets-Sheet 4

INVENTOR
W. L. BOND
BY
H. O. Wright
ATTORNEY

United States Patent Office 2,819,405
Patented Jan. 7, 1958

2,819,405

AUTOMATIC RECORDING DIFFRACTOMETER AND PLOTTER

Walter L. Bond, New Providence, N. J., assignor to Bell Telephone Laboratories, Incorporated, New York, N. Y., a corporation of New York Application March 26, 1954, Serial No. 418,926

18 Claims. (Cl. 250—53)

This invention relates to an improved automatic recording diffractometer affording permanently recorded, accurately correlated, Bragg angle and crystal position angle versus integrated quantitative intensity data, for each reflection obtained from a crystal specimen, and a plotting device for use therewith, the plotting device affording from the diffractometer data an undistorted reciprocal lattice plot of the crystal specimen, the data and reciprocal lattice being obtained with minimum requirements of time and effort on the part of the operator. More particularly, it relates to a type of diffractometer automatically affording a permanent record of the above-described data and a type of plotting device affording from the data an undistorted reciprocal lattice plot of the crystal from which the data is obtained. In a more particular form, the invention relates to a combination of diffractometer and plotting device, the combination automatically affording both recorded data and an undistorted reciprocal lattice of a specimen crystal.

The importance of obtaining an accurate integrated intensity indication for each and every reflection recorded by diffractometers cannot be too strongly emphasized since such indications are, as will be discussed in more detail hereinunder, frequently the most important factor in resolving the constitution of complicated "unit cells" of a crystal specimen. The maximum amplitude of a reflection may vary widely even for reflections whose integrated intensities are substantially identical and therefore maximum amplitude observations may be entirely misleading as a basis for the analysis of crystal structure, i. e., for determining the arrangement in plan and elevation of the component atoms, ions or electrons within the "unit cell" of the specimen crystal. This is particularly pertinent in the case of substances subject to more or less deformation by external forces. For example, a salt crystal (sodium chloride) is rather susceptible to permanent deformation by external forces, and reflections from a slightly deformed crystal specimen may be of reduced amplitude but of broader angular base as contrasted with higher amplitude and narrower base reflections from the same crystal if not deformed. In such a case the integrated intensities of the two types of reflections would be substantially identical whereas the maximum amplitudes might be very substantially different. Analyses based solely on observations of maximum amplitudes of the reflections can therefore be seriously in error.

The primary object of the invention is to advance the art of crystallography by improving diffraction data measuring and recording methods and apparatus.

A further principal object is to afford accurate integrated quantitative intensity data for each reflection observed, suitably correlated with the Bragg angle and position angle at which the reflection occurred.

A subsidiary object of the invention is to simplify and expedite the determination of the reciprocal lattice of a specimen crystal.

A further object is to afford a method and apparatus for determining more complete and adequate reflection data concerning a specimen crystal with a minimum of the operator's time and effort.

A still further object is to afford an automatic method and means for rapidly scanning an extended range to detect particular phenomena occurring in said range together with an automatic method and means for slowly scanning and accurately measuring particular characteristics of each of such phenomena when detected.

Another object is to afford permanent, positively correlated, accurate records of angle and integrated intensity data for each reflection obtained from a specimen crystal by an automatically scanning diffractometer device.

An additional object is to provide a method and means for automatically plotting diffractometer data to afford undistorted reciprocal lattice plots of crystals from which the data is obtained.

Other and further objects of the invention will become apparent during the course of the following detailed description of illustrative structures embodying the principles of the invention and from the appended claims.

The highly developed state of the science of crystallography and the importance of analysis by diffraction of crystals to that science are at once apparent from a perusal of any of the large number of excellent text-books and other scientific publications available. As typical examples of text books, reference may be had to those entitled "X-Ray Crystallography" by M. J. Buerger, John Wiley & Sons, Inc., New York, 1942; "Chemical Crystallography" by C. W. Bunn, Oxford Press, London, 1945; "X-Ray Analysis of Crystals" by J. M. Bijvoet, et al., Interscience Publishers, Inc., New York, 1951; "Selected Topics in X-Ray Crystallography" edited by J. Bouman, Interscience Publishers, Inc., New York, 1951; "The Structure of Crystals" by R. W. G. Wyckoff, Chemical Catalog Co., Inc., New York, 1924; and numerous others.

As has long been recognized by those skilled in the art, crystals result from the tendency of their component atoms, ions or molecules to arrange themselves in a regular manner so as to form a definite three-dimensional pattern, having three coordinate axes, the directions of which are usually considered as defined by the directions of the three unit translations $a$, $b$, and $c$, respectively, of the pattern. (See Buerger, supra, page 4, Fig. 2A.) Every crystal is therefore characterized by a "unit cell" or unit three-dimensional pattern repeating itself throughout the entire crystal.

This orderly arrangement results from the tendency of atoms, ions and/or molecules to settle into positions of minimum energy.

The "unit cells" or patterns may assume any of numerous and varied shapes, provided such shapes permit indefinite extensions. In general, a particular different unit cell or unit three-dimensional pattern is characteristic of each different crystal species. For some crystals the pattern is a cube, for others it is rectangular with all three edges of different lengths, and for still others the edges may be both of different lengths and at different angles with respect to each other.

By virtue of the regular repetition in three dimensions of the "unit cell" or three-dimensional pattern, each crystal may usually be assigned any one of an infinite number of three-dimensional mesh or "lattice" arrangements comprising three mutually intermeshing and intersecting sets of parallel straight lines (see Buerger, supra, pages 4 through 6).

For crystals of cubic or rectangular unit cells or patterns, by way of elementary examples, each of the three sets of parallel lines can most conveniently be orthogonally related to the other two sets.

Intersection points of the three sets of parallel straight lines forming the lattice are selected in any of a number of ways (see texts supra) as the corners of the successive unit cells or patterns of the crystal. These corners are usually chosen as points at which atoms, molecules or ions are situated so that for crystals having relatively simple types of "unit cells," the intersections of the lattice usually indicate, at least to a considerable degree, the manner in which the atoms, molecules or ions are distributed throughout the crystal. Many crystals, however, have very complicated arrangements of their constituent atoms, ions or molecules within their respective "unit cells" and therefore present much more difficult problems in connection with the complete determination of their cell structures.

Each three-dimensional lattice can obviously be considered as a plurality of plane or two-dimensional lattices which are mutually parallel and spaced uniformly in the third dimension. Each two-dimensional lattice normally represents a plane surface over which the atoms, ions, or molecules are distributed according to a regular pattern, the particular pattern being determined according to the substance and particular crystalline structure involved. Any such two-dimensional plane array would reflect energy rays of appropriate wavelength over a large range of incident angles. For the majority of crystals, energy rays within the wavelengths usually characterized by the designation "X-rays" will be found to be suitable. Accordingly, it will be assumed for the majority of illustrative embodiments of the invention described that "X-rays" can appropriately be used, for demonstrative purposes, at least. In some instances the size of the unit cell may be such that rays of wavelengths longer or shorter than those ordinarily characterized as "X-rays" are required to obtain satisfactory results. Since the crystalline structure comprises a large number of these plane arrays parallel to each other and regularly spaced in a third dimension, interference effects will normally restrict reflection from the crystal to a relatively few specific angles only. A knowledge of these angles and the integrated intensity of each reflection enables one skilled in the art of crystallography to deduce much pertinent information relative to the structure of the specimen crystal.

For some substances, as mentioned above, the arrangements of atoms, ions or molecules within the unit cell are relatively simple and can be readily determined from a modest quantity and quality of data. For other substances, however, the arrangements of the atoms, ions or molecules within the unit cell may be extremely complicated (see, for example, the Bunn text, supra, Fig. 189, page 309, and Fig. 192, page 312) and a large amount of accurate data may be required to determine with any certainty the arrangement in plan and elevation, within the unit cell, of the atoms, ions and/or molecules of which the cell is constituted. For resolving such problems it is very often essential that highly accurate integrated intensity data for each and every reflection be obtained. The apparatus of the present invention is particularly well adapted to provide such accurate data in suitably correlated form for convenient use.

For each crystal lattice a "reciprocal lattice" can be derived as discussed, for example, in chapter 6 of the text by Buerger mentioned above, starting at page 107. The advantageous features of the reciprocal lattice as a powerful tool for assisting in the determination of crystal structure, are expounded in detail in several of the above mentioned texts and numerous other publications. As mentioned above, a subsidiary object of the present invention is to facilitate the determination of an undistorted reciprocal lattice of a specimen crystal.

In crystal structure determinations it is necessary to know the integrated reflection intensities of many atomic planes $(hkl)$, where $h$, $k$ and $l$ are, in turn, the indices of each of the plurality of parallel atomic planes having values corresponding to the intercepts of each specific plane along the coordinate axes defined, for example, by the directions of the unit translations $a$, $b$, and $c$, respectively, of the crystal being considered in each instance. (See Buerger, supra, pages 8 and 9.) Usually of each group of parallel atomic planes, the "parametral" plane, i. e., the plane at the interplane spacing "$d$" from the origin of coordinates is taken as representative of the group.

In single crystal analysis, the prior art methods most often used for determining the intensity, or amplitude, of the observed reflections, involve visual estimation of the actual and relative amplitudes and intensities as represented solely by numerous spots of varying densities on photographic films. This method is arduous, time consuming and frequently leaves very much to be desired in the matters of accuracy and completeness.

The present trend, therefore, is toward automatic methods employing X-ray detectors, such as the Geiger counter, in conjunction with recording devices, the preferred arrangements being capable of quantitatively indicating intensity or amplitude, as well as relative angular position, with satisfactory degrees of accuracy.

However, the existing prior art equipments either do not give enough information to enable one to index the reflections, i. e., to determine the indices $h$, $k$, and $l$ of the reflecting planes for each and every recorded reflection, for each of several "levels" of the crystal specimen or else such equipments must be hand set to the numerous individual positions in which calculation shows a reflection should be found, and the values of the indices $h$, $k$, $l$ can then be written in as each peak is recorded.

Since a great number of reflections must ordinarily be measured as an adequate basis for the X-ray analysis of each specimen crystal, it is obvious that it is indeed worthwhile to provide methods and apparatus for obtaining automatic readings and automatically recorded and/or plotted permanent data of appropriate form and adequate quantity and quality in accordance with the arrangements of the present invention.

The arrangements of the present invention will, accordingly, be directed toward precisely securing and rotating a specimen crystal in the path of a narrow exploratory X-ray beam, concurrently rotating about the specimen a device for detecting reflections of the exploratory X-ray beam from the specimen crystal, recording (in permanent form if so desired) the integrated intensities of each of the reflections and the angles of the crystal specimen and of the detecting device with respect to the direction of the exploratory beam for each reflection, and as a final optional step, translating the above mentioned data into an undistorted reciprocal lattice (also in permanent form) for the specimen crystal.

The principles of the invention and the methods and apparatus for achieving the objects of the invention will be more readily understood from the detailed description of specific illustrative arrangements given hereinunder, taken in conjunction with the accompanying drawings in which.

Figure 6:
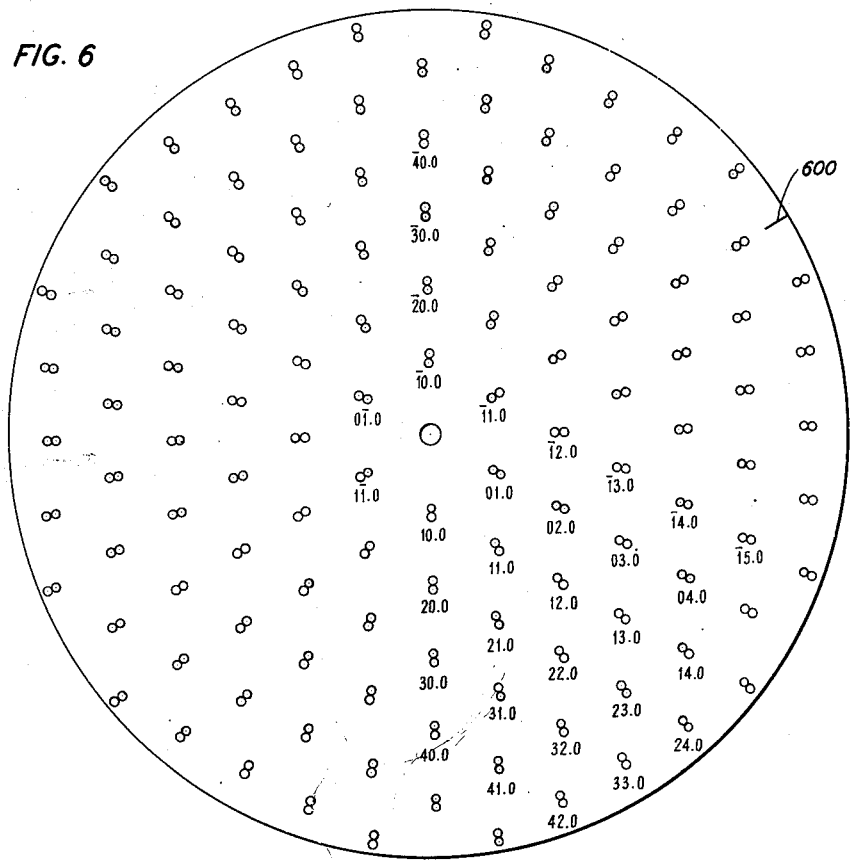
Figure 3:
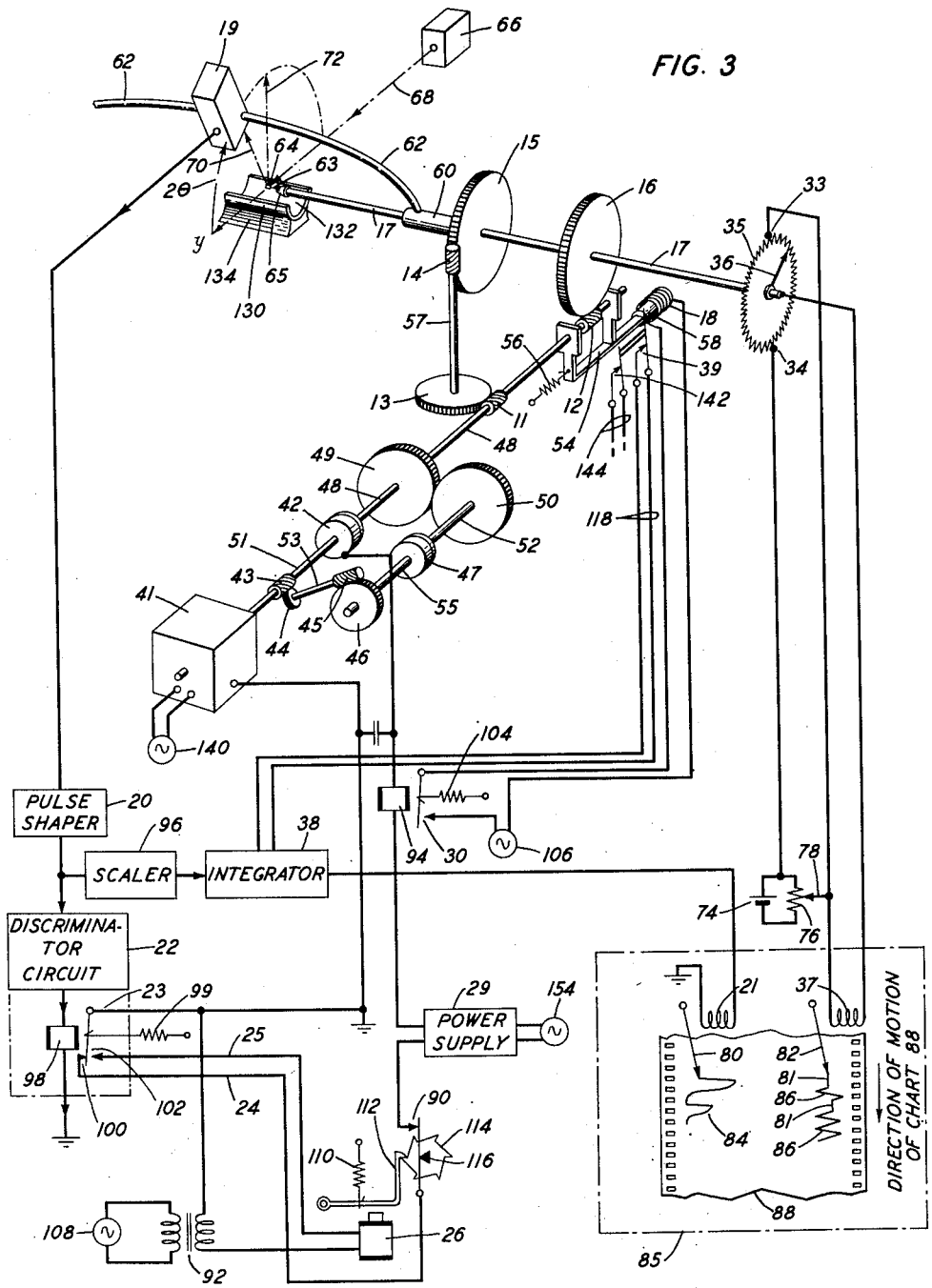
Fig. 3 shows, in a diagrammatic form, an automatic recording X-ray diffractometer embodying certain principles of the invention.
Figure 4:
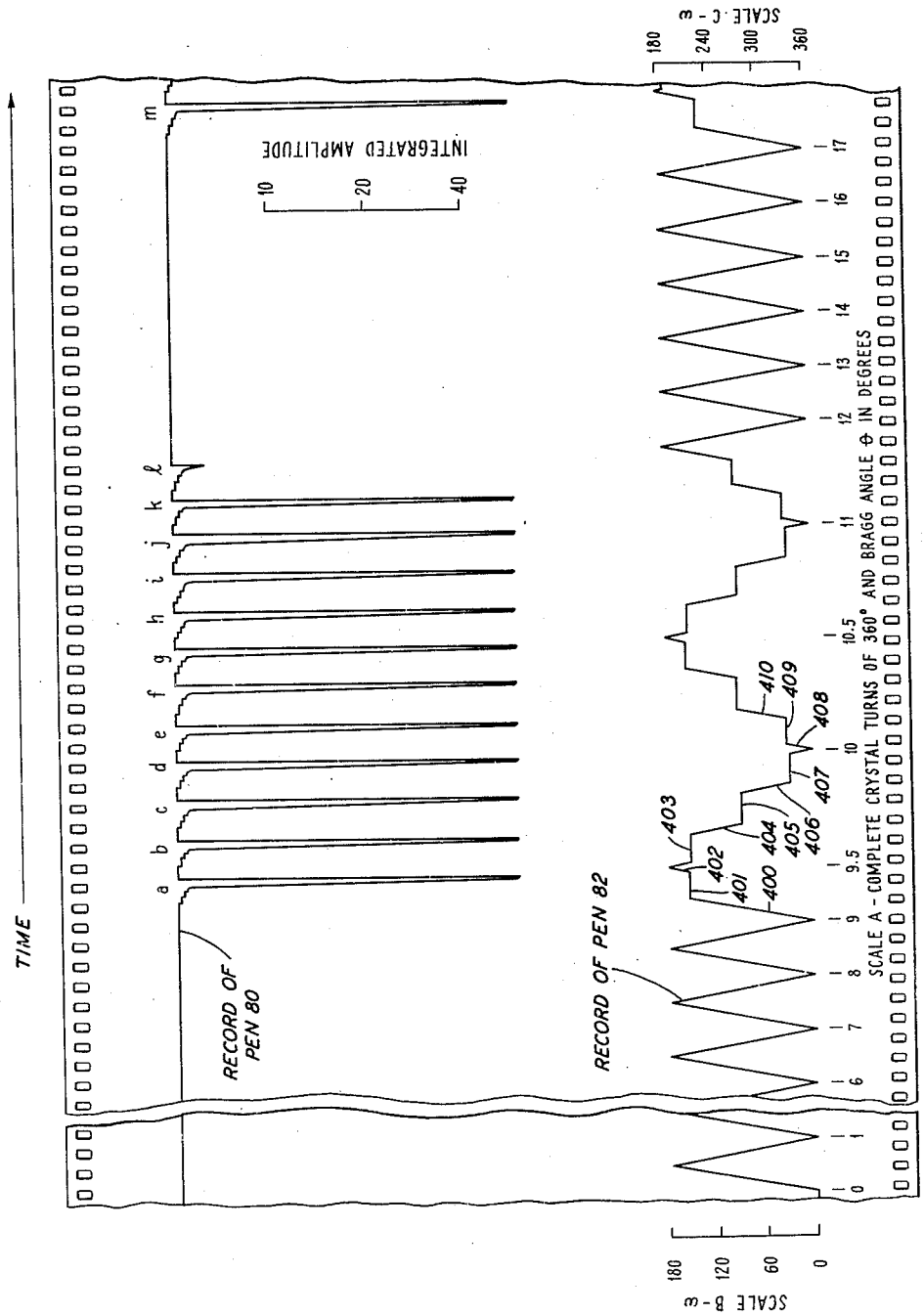
Fig. 4 illustrates a particular specific data for a quartz crystal being rotated about its hexagonal axis, recorded by the diffractometer of Fig. 3.
Figure 5:
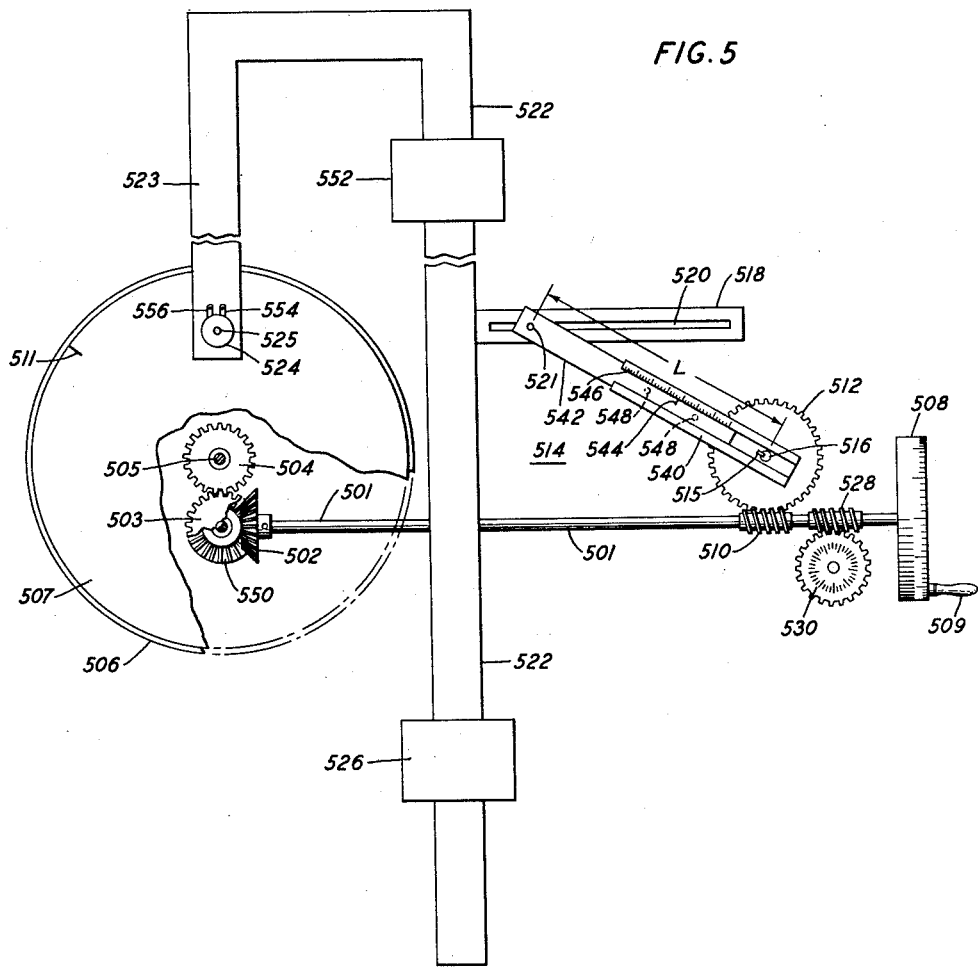
Fig. 5 shows in diagrammatic form one type of mechanism suitable for use as a "plotter" of the invention to convert the data obtained by the diffractometer of Fig. 3 into an undistorted reciprocal lattice of the specimen crystal.
Figure 7:
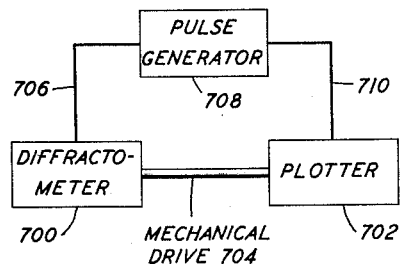

Fig. 6 illustrates a plot of an undistorted zero-level reciprocal lattice obtained by use of the "plotter" of Fig. 5 for the quartz crystal specimen, a portion of the diffractometer data for which is shown in Fig. 4; and Fig. 7 shows in diagrammatic form the over-all combination of a diffractometer of the type illustrated in Fig. 3 and a plotter of the type illustrated in Fig. 5 capable of automatically obtaining the requisite reflection integrated intensity and angle data with respect to a specimen crystal in permanent record form and automatically plotting from said data, an undistorted reciprocal lattice of the specimen crystal.

To be able to index completely a set of X-ray intensity readings it is necessary to know for each reflection the corresponding crystal position and the Bragg angle, i. e., one half the sum of the angles of incidence and reflection of the X-ray beam for the particular reflection. (See Buerger, supra, page 45).

For purposes of illustration we will first describe the taking of diffractometer data for the "zero" level of the crystal, i. e., we will consider all reflections ($hk0$) (i. e., reflections from planes which do not intersect the "$c$" axis, which means, of course, that the planes are parallel to the "$c$" axis of the crystal). The extension of the process to other levels will follow directly, as will become apparent hereinbelow.

Figure 1:
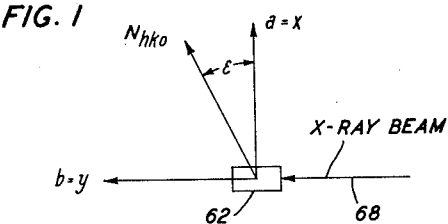
Fig. 1 illustrates diagrammatically a specimen crystal and also illustrates a convenient ideal initial alignment thereof with the direction of the exploratory X-ray beam.
Figure 2:
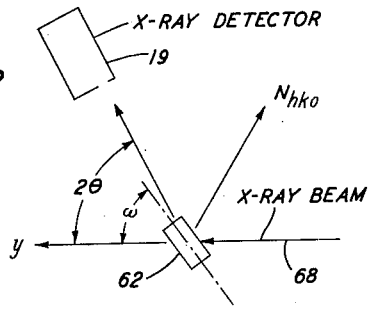
Fig. 2 shows the specimen crystal of Fig. 1 after rotation through a specific angle with respect to the direction of the X-ray beam.

In Fig. 1, an orthorhombic crystal 62 is shown in what may be considered as ideal appropriate initial conditions. Here a narrow, or sharply defined, X-ray beam 68, which beam is substantially of a single wavelength, is directed along and defines the $y$ axis of the orthogonally related axes $x$, $y$ and $z$, the $x$ axis being vertical, the $y$ axis being horizontal and the $z$ axis being perpendicular to the plane of the drawing, in the example illustrated, the origin of the axes being substantially coincident with the center of the crystal. The crystal $b$ axis direction is coincident with the $y$ axis. The crystal subsequently will be caused to rotate about the $z$ axis which in Fig. 1 coincides with the $c$ axis of the crystal. Initially then, the $a$ axis of the crystal coincides with the $x$ axis of the figure, the fixed axes $x$, $y$ and $z$ serve to define the rotations of the crystal axes $a$, $b$ and $c$, respectively. At an angle $\epsilon$ from crystal axis $a$ is the vector $N_{hk0}$, the normal to a particular ($hk0$) plane of the crystal. For an orthorhombic crystal, for example, angle $\epsilon$ is given by the equation:

$$\tan \epsilon = \frac{k/b}{h/a} \quad (1)$$

where $a$ and $b$ refer to relative atomic spacings along the $a$ and $b$ axes, respectively, and $h$ and $k$ are the indices of the reflecting atomic plane along these same axes, respectively. If the crystal be rotated clockwise through an angle $\epsilon$, the vector or "normal" $N_{hk0}$ will coincide with the $x$ axis and the X-ray beam will be parallel to the atomic plane ($hk0$). In order to have an X-ray reflection upward from this plane the crystal must be rotated further in a clockwise direction by an angle $\theta$ where $\theta$ is the "Bragg angle." Hence the total crystal rotation necessary to have a reflection from the particular atomic plane ($hk0$) is $$\omega = \epsilon + \theta \quad (2)$$

and in order to intercept the reflected X-ray beam, since the angle of reflection is equal to the angle of incidence, the X-ray detector must be at an angle of $2\theta$ measured clockwise from the $y$ axis, as shown in Fig. 2. Here $\theta$ is given by Braggs law:

$$\lambda = 2d \sin \theta \quad (3)$$

$\lambda$ being the wavelength of the X-ray, and $d$ the distance between successive ones of the plurality of parallel atomic planes ($hk0$) which contribute to the particular reflection under observation. For an orthorhombic crystal, for example, $$\frac{1}{d^2} = \frac{h^2}{a_0^2} + \frac{k^2}{b_0^2} \quad (4)$$

where $a_0$ and $b_0$ are the respective values in Angstroms of the unit translations $a$ and $b$ for the specific crystal. If we record for each reflection the values of angles $\omega$ and $\theta$ we, obviously, can readily find, by Equation 2, the direction angle $\epsilon$ of each plane normal. A polar plot of $$\frac{1}{d}\left(\text{or its equivalent, } \frac{2 \sin \theta}{\lambda}\right)$$

against direction angle $\epsilon$ is the reciprocal lattice of the zero level, each lattice point representing one reflection plane. Having this reciprocal lattice we can, in many instances, immediately index all reflections, as will be illustrated in detail hereinunder.

In Fig. 2, the crystal 62 has been turned through the specific angle $\omega$, as defined in Equation 2, and is reflecting a ray into the detector tube 19 which has been turned to the required angle $2\theta$ from the $y$ axis at which the reflected beam can be intercepted, as stated above and illustrated in Fig. 2. In order to find all the combinations of values of the angles $\omega$ and $\theta$ that correspond to Bragg angle reflections we could start with the detecting devic 19 at zero angle, i. e., on the $y$ axis, turn the crystal through 360 degrees, then raise the detecting device a small angle, turn the crystal through 360 degrees, raise the detecting device again by an additional small angle, et cetera, continuing to do this until all combinations of $\omega$ and $\theta$ have been covered and all the Bragg angle reflections in the level have thus been obtained.

The aperture or opening of the detector 19 should, obviously, subtend an angle at the crystal equal to or greater than the increments by which the detector is raised per revolution of the crystal.

Virtually identical results can be obtained more readily by mechanically interconnecting the mechanisms carrying the detecting device and the crystal so that the rotational motions of both are continuous and definitely interrelated. In such a case, if the angle $\omega$ through which the crystal is turned is then continuously recorded it will serve also to indicate at each instant the angle $\theta$. The angle $\theta$ is of course one half the angle $2\theta$ through which the X-ray detector has been turned. A "fast" pen recording oscilloscopic device, suitable forms of which are commercially available, having two recording pens and a continuously moving paper strip chart, can conveniently be employed, one pen recording the angles $\omega$ and $\theta$, as above indicated, and the other simultaneously recording in appropriate juxtaposition the output amplitude of the overall detecting detecting circuit, or an appropriately selected function of said output. The discussion of a portion of a specific illustrative sample record of this type, shown in Fig. 4, given hereinunder will facilitate comprehension of these features.

One specific illustrative form of a diffractometer embodying certain features of the invention is shown in Fig. 3. The salient features of this diffractometer will first be described and thereafter a more detailed description of each component element or circuit of this embodiment will be given.

In the diffractometer illustrated in Fig. 3, the relative rotations of the X-ray detecting device 19 and the crystal 64 are controlled through trains of gears, to be described more fully hereinunder, which trains of gears can have, by way of example, a mechanical ratio of 1 to 180, i. e., the crystal is turned 180 complete revolutions to one revolution of the detecting device. This particular arrangement is very convenient since, coupled with the fact that the angular position of the detecting device, when a reflection is detected, defines the angle $2\theta$, it is evident that the angle $\theta$ increases one degree for each complete rotation, or "turn," of the crystal (360°). Therefore "crystal turns" of the record, when the above specified arrangement is employed, are also "degrees of the angle $\theta$." Obviously, as will become apparent in considering the sample indications shown in Fig. 4, the over-all arrangement affords a very precise indication of the exact value of $\theta$ for each reflection to a small fraction of a degree.

The correlation of the rotation of the crystal with the rotation of the X-ray detector, as illustrated by the arrangement of Fig. 3, is based on the important concept that the various Bragg angle reflections can be considered as each occurring within a particular different crystal turn. In general Bragg angle reflections are encountered, in such a system, during substantially separated turns of the specimen crystal. The consequent introduction of the parameter $\omega'$ representing, at any instant, the total number of degrees of rotation of the crystal specimen from a starting position defined by $\theta=0$ and $\omega'=0$, together with the use of the extremely simple relations $$\epsilon = \omega' - \theta \text{ and } \theta = \frac{\omega'}{K}$$

where K is a constant number of degrees by which the angle $\omega'$ increases for each increase of one degree of $\theta$ ($K=360$ degrees for the specific arrangement of Fig. 3) makes possible a far more simple, systematic, and comprehensible presentation of the data defining a level of the specimen crystal than any prior art scheme of which applicant is aware. The resulting simplification will become more readily apparent, hereinbelow, in connection with the plotting of an undistorted reciprocal lattice of a level the data for which is organized in accordance with the above concepts.

The angle $\omega'$ can be conveniently recorded by connecting one pen 82 of the fast recording, double pen, type recorder 85 to the contact arm 36 of a continuously variable potentiometer 35, which arm 36 is driven by shaft 17 and is, consequently, rotated synchronously with the specimen crystal 64. This arm 36 picks up a potential that rises and falls uniformly as the crystal turns thus making a sawtooth trace on the record for each complete rotation of the crystal, each tooth having the form of an isosceles triangle. One tooth is therefore one turn of the crystal or 360 degrees of the angle $\omega$ and also one degree of the angle $\theta$. Throughout this specification the symbol $\omega$ will in general be used to indicate the angle of the crystal specimen within a particular full turn and the symbol $\omega'$ will be used to indicate the complete angle with respect to the initial setting of zero for both $\omega$ and $\theta$, i. e., $\omega'$ will usually be a specific number of full 360 degree turns plus the fraction, if any, ($\omega$) of the instant turn.

Obviously numerous other specific relative gear ratios resulting in other specific relations between crystal turns and the angles $\omega'$ and $\theta$ can be employed if deemed more convenient in particular instances. Several specific other ratios will be described hereinbelow.

With the specific arrangement described above, for example, if no activity above an arbitrarily selected threshold value is indicated by the detecting device until the crystal has reached its twenty-first turn, then there is no "Bragg angle" less than a value (of the angle $\theta$) of 21 degrees.

The fraction of a turn at which activity is indicated by the detecting device, i. e., the position of the indication relative to the particular tooth of the sawtooth record being made concurrently therewith, shows both the angle $\omega$ of the crystal in that particular turn and the fractional part of the last degree of the angle $\theta$ at the instant at which the reflection occurs. Obviously, the near or rising side of each sawtooth represents the first 180 degrees of its respective turn and the far or decreasing side of the tooth represents angles between 180 degrees and 360 degrees, inclusive, of the turn.

Appropriate scales from zero to 180 degrees and from 180 degrees to 360 degrees are, accordingly, readily devised to aid in determining the angle of the crystal within a specific "turn" at which a reflection occurred. In order to further facilitate determination of the position of such an indication on the slope of a sawtooth, as well as to facilitate the accurate recording of the reflections as will presently become apparent, an arrangement for expanding the portion of the record including and immediately adjacent the indication, on both sides thereof, is provided and will be described in detail hereinunder.

An arrangement of the last mentioned type is essential with a pen recording device since the recorder pen requires a perceptible time interval in which to function. For fast recording types of pen recorders, such as are used in diffractometers of the invention, the pen will stabilize in a new position in approximately one second. Consequently the crystal must be turned slowly enough that a peak is not passed through in less than a second.

Assuming that a peak is one half a degree wide, the crystal must turn more slowly than one half a degree in two seconds time. This corresponds to one complete rotation of the crystal in approximately twenty four minutes of time. At this rate it would require in the order of thirty six hours to cover the range of values of the angle $\theta$ from zero to 90 degrees, inclusive, i. e., one "level" which would be too slow for practical purposes.

Consequently, in accordance with the principles of the invention, two speeds of rotational drive are employed, namely, a "fast" speed for scanning regions in which no reflections are detected and a "slow" speed for use only while recording a detected reflection.

In the illustrative example of a diffractometer of the invention as shown in Fig. 3 and described in detail below, the "fast" rotational speed is selected so that the specimen crystal is completely rotated through a 360 degree turn in a time period of a little more than one minute, and the "slow" rotational speed is such that a complete rotation through a 360 degree turn of the crystal requires one hundred times this interval. Thus to record a complete level at the "fast" rotational speed would require a little more than one and one half hours while at the "slow" rotational speed over 150 hours would be required.

During the taking of the diffractometer data for the zero level, a right circular cylindrically shaped holder 130 is supported beneath the specimen crystal by a fixed pedestal member 134. A piece of film 132 is fitted and held snugly against the concave surface of holder 130, the film being encased in a black paper envelope to exclude light. The longitudinal axis of rotation of the concave surface of holder 130 is substantially coincident with the axis about which the specimen crystal is being rotated, the center of holder 130 being directly beneath the center of the specimen crystal, substantially. The upper edges of holder 130 with film 132 assembled therein, are sufficiently below the line of the X-ray beam 68 to avoid any interference to the passage of the beam 68. The purpose of this arrangement will be discussed in detail hereinunder, in the section entitled "Obtaining Other Than Zero Levels."

At the above-mentioned "fast" rotational speed a sharp peak is nearly covered in the reaction time of the relays employed in the circuits of the illustrative arrangement to control the angular rotation speed. To ensure the recording at the slow speed of a complete sharp peak, therefore, the crystal is "back-set" a few degrees by a device 54 described below, when the speed is changed and simultaneously with the change from fast to slow rotational speeds.

The scanning of the reflection is then effected at the slow speed after which the fast speed is again reestablished and simultaneously the crystal is advanced a few degrees, i. e., by the same increment as employed for the above-mentioned "back-set." This speed changing and back-setting arrangement, therefore, serves as a "line (or reflection) anticipator" so that a complete slow speed record of each Bragg angle reflection is obtained.

When the "back-setter" turns the crystal back the signal is obviously reduced since substantially no reflection occurs when the angle of the crystal is thus decreased by several degrees. Another relay 26, is therefore, employed to prevent an immediate return to the "fast" scanning condition and to hold the "back-setter" from returning to its normal or fast scanning position until the slow scan has been completed. This latter relay 26 is of the type known in the art as a "ratchet" relay and its contacts are opened by one electrical impulse through its winding and closed by the next such impulse. Hence it operates as an "alternator" and prevents the "premonitory" impulse fall (caused by the operation of the "back-setter") from being treated as the drop of the signal from X-ray detector 19 upon completing the slow scanning of the reflection.

The illustrative embodiment of a diffractometer of the invention shown in Fig. 3 includes the following units. A geared motor 41, connected to a 115 volt alternating current source 140, drives a shaft 51 at a speed of substantially 14 revolutions per minute. A portion of the "fast," magnetically operated, clutch 42 is driven by shaft 51. A worm 43, mounted on shaft 51, turns worm gear 44 on shaft 53. Worm 45, at the other end of shaft 53, turns worm gear 46 on shaft 55, which shaft turns a portion of the "slow" clutch 47. Slow clutch 47 is of the type well known in the mechanical art as a "one direction" clutch, i. e., it slips in one direction but holds in the opposite direction of rotation. Consequently, when "fast" clutch 42 is not engaged, shaft 48 is driven slowly by the slow clutch 47 through shaft 52 and the pair of unity ratio gears 49 and 50. When the "fast" clutch 42 is engaged shafts 48 and 52 are turned at the high rotational speed and the slow clutch 47 slips at a rate determined, obviously, by the difference between the fast and slow driving speeds.

Shaft 48 drives worms 11 and 12. Worm 11 turns worm gear 13 which turns worm 14 through shaft 57. Worm 14 turns worm gear 15 which drives sleeve 60, to which support 62, carrying the X-ray detector 19, is attached. Support 62 is curved about the center point at which the specimen crystal 64 is supported so that when X-ray detector 19 is moved along support 62 it will always be directed toward the specimen crystal and can thereby be readily adjusted to any angle, within a wide range, with respect to the specimen crystal 64. As will become apparent hereinafter, this arrangement, in conjunction with an arrangement for rotating the entire mechanism controlling the crystal and detector rotations, about the vertical axis 72 through the center of the specimen crystal, to be described hereinunder, makes possible the convenient measurement of various "levels" other than the zero level of the crystal specimen.

Worm 12 on shaft 48 turns worm gear 16 which is mounted on and fastened to shaft 17, at the left-hand end of which shaft is a multiple adjustable chuck 65 adapted to accurately position and hold a glass filament 63 on the free end of which filament the crystal specimen 64 to be tested is mounted.

As described, hereinabove, the gear ratios are normally such that shaft 17 is driven so as to rotate 180 times as fast as sleeve 60 to which the X-ray detector 19 is connected.

Worm 12 is keyed to the shaft 48 so that it must rotate with shaft 48 but it can be slid along the shaft by the "back-setting" yoke 54 which in turn can be moved in one direction by the solenoid comprising plunger 58 and coil 18. A spring 56 on the end of yoke 54 opposite plunger 58 returns the worm to its normal position when the solenoid coil 18 is deenergized, thus setting the crystal ahead by the same amount as it is back-set when the solenoid coil 18 is energized for the duration of each slow recording operation. The sliding of the worm 12 by the operation of solenoid coil 18 drawing plunger 58 into the coil, of course, effects the back-setting operation described hereinabove.

The source of the X-ray beam 66 should be of the type in which the ray 68, directed toward the specimen crystal to be examined, is rendered monochromatic, i. e., substantially of a single wavelength, by, for example, reflecting it from a pentaerythritol, or blood-sugar, crystal toward the specimen. (In general, as is well understood by those skilled in the art, correction of the recorded intensities for the effects of polarization and the Lorentz factor must be made where precise intensity values are required.) (See the text entitled "The Interpretation of X-Ray Diffraction Photographs" by Henry, Lipson and Wooster published by McMillan and Co., Ltd., London, 1951, page 32, section 6. Incidentally, suitable precautions against the harmful effects of X-rays should be taken, as suggested, for example, at page 33, section 7, of the Henry et al. text.) To prevent "scattering" of the X-ray beam and possible injury to personnel using the apparatus the path of the beam is, insofar as possible, preferably enclosed by a suitable metallic sheath. A "catching tube" of the same material is also preferably provided on the opposite side of the specimen crystal to absorb and/or reflect energy which has passed through or by the specimen. To avoid unnecessary complication of the drawing such devices, which are entirely familiar to those skilled in the art, have not been shown in Fig. 3.

When the angle $\omega$ of the crystal specimen 64 and the angle ($2\theta$) of the X-ray detector 19 have values satisfying the Equation 2, concurrently with an appropriate value of the angle $\epsilon$ of the specimen, as described in detail above, a reflection 70 of the ray 68 will be intercepted by the X-ray detector 19.

The X-ray detector 19 is preferably of the multiple unit type of Geiger counter, available commercially, since each unit is capable of receiving only one quanta of reflected X-ray energy after which it is disabled for a short period. The multiunit type, having in the neighborhood of ten units, has been found suitable for the purposes of the diffractometers of the present invention to afford reliable integrated intensity indications of the reflections obtained from numerous and varied types of specimen crystals.

As previously stated, the aperture or opening in the X-ray detector should preferably be wider than the amount by which it is moved during the time of a complete turn of the crystal specimen. In the diffractometer of Fig. 3 the X-ray detector 19 is, for most purposes, given an aperture or opening two degrees wide in $\theta$ (or four degrees of detector motion) corresponding to the detector motion for two complete turns of the specimen crystal. Because of this, the majority of reflections will be recorded twice, though in some instances the first and/or the last of a series of reflections may not be completely received before the detector aperture has moved out of alignment with the path of the reflected ray.

In special instances, one or more of which will be discussed in detail hereinunder, it may be necessary to employ a somewhat more narrow aperture for the X-ray detector 19.

Suitable means for adjusting the aperture opening, for example, an arrangement of the general type employed to adjust the aperture of a photographic camera, is, therefore, preferably provided for the X-ray detector.

The positioning of the aperture of the detecting device 19 should be such that in the direction in which the detector is rotated by support 62 the aperture is as close to the forward edge of the detector as practicable. The detector can then approach more closely to the value of 180 degrees for angle 2θ without interference from the guard member in which the X-ray beam 68 is preferably enclosed, as described above.

The specimen crystal 64 is preferably small so that it may be mounted on the end of a slender filament 63 of glass, or similar material, held in the compound chuck 65. The chuck 65 should afford, as mentioned above, precise adjustment of the position of the filament 63 in three orthogonally related directions, one being parallel to the axis of shaft 17. The chuck should also afford a substantial range of adjustment of the angle which the axis of the crystal makes with the direction of the exploratory ray 68. (See, for example, Fig. 97B at page 184 of Buerger, supra.)

Substantially cylindrical specimen crystals having overall dimensions in the order of one thirty-second of an inch or less have been found suitable for the purposes of the present invention. A suitably mounted crystal is shown, for example, in Fig. 96 at page 183 of the text by Buerger, mentioned above.

For substantially each X-ray quantum received in the X-ray detector 19 an impulse is sent to the pulse shaping circuit 20. In circuit 20 these pulses are clipped to a standard height and trimmed to a standard duration. A part of the standardized output of pulse shaper 20 goes through a scaling or counting circuit 96 to an integrating circuit 38 and part of the output of pulse shaper 20 goes to a rate meter circuit in the discriminator 22. Suitable circuits of the general types indicated are well known to those skilled in the art. As long as the rate of pulse reception from the X-ray detector 19 is below a predetermined threshold, the relay 98 which is controlled by the rate meter circuit, above mentioned, does not release and conductor 23 remains connected to conductor 24. Hence current from the power supply 29 can flow through contact 90 of ratchet relay 26, conductors 24, 23 and thence to the grounded motor 41 and through shaft 51 to the near side of fast clutch 42, the return circuit being through the winding of relay 94 and thence back to the power supply 29. Power supply 29 preferably converts energy from a commercial 115 volt alternating current source to substantially 90 volts direct current and should be capable of supplying at least 0.1 ampere.

If, as above described, the X-ray reflection is below threshold, clutch 42 drives the diffractometer at "high" speed and relay 94 holds contact 30 open against the pull of spring 104, so that the back-setter 54, et cetera, is in its normal or forward position as shown in Fig. 3.

When the detected X-ray intensities rise above the threshold value of discriminator circuit 22 relay 98 loses its operating current and spring 99 then opens contact 100 and closes contact 102, thus disconnecting conductors 23 and 24 and connecting conductors 23 and 25. Numerous circuits providing discrimination on the basis of amplitude of the input signal are well known to those skilled in the art involved. The breaking of contact 100 interrupts the current through the fast clutch 42 and relay 94. Consequently the drive of the gear trains is now effected through the slow clutch 47 and as contact 30 is closed by spring 104, power from 115 volt alternating current source 106 is supplied to the coil of the solenoid 18, which then pulls plunger 58 and yoke 54 to the right and the crystal is set back as described above and the signal from detector 19 falls abruptly to substantially the noise level. When lead 23 is connected to lead 25, power is supplied from 115 volt alternating current source 108, through isolating transformer 92, to ratchet relay 26, which steps up one step against the pull of spring 110, and cam 116 on ratchet wheel 114 is turned so that contact 90 is opened. When lead 23 is reconnected to lead 24, the clutch circuit is therefore open at contact 90 and the high speed drive cannot be reestablished until the signal has risen and fallen once again, i. e., until the detected X-ray reflection has been properly recorded at slow speed. The subsequent rise of the output of detector 19 causes another impulse to go to the winding of ratchet relay 26, as above described, so that it steps up another step and contact 90 closes again. When the signal falls now, the circuit is again in its original condition as shown in Fig. 3 and the "high" speed drive is reestablished.

As stated above, a part of the standardized output of circuit 20 goes to the integrator 38 via a preliminary integrator or scaler 96, of the pulse counting type well known to those skilled in the art. The impulses reaching integrator 38 are stored by integrator 38 in a high quality energy storage device which can, for example, be a (commercially available) condenser (not shown in Fig. 3). Since each impulse from scaler 96 brings in the same quantity of electricity, the voltage across the condenser is a measure of the number of impulses, which in turn is a function of the integrated intensity of the reflection detected by detector 19. This voltage controls the control electrode of an electrometer tube, of very high input impedance, in integrator 38. The plate current of the electrometer tube goes to winding 21 which controls the position of pen 80 of the recorder 85. The condenser is normally kept short-circuited by leads 118 and contacts 39 when there is no signal, but when the signal rises to threshold, the back-setter 54, et cetera, operates and opens a conventional microswitch, represented by the two sets of contacts 39 and 142. The purpose of contacts 142 and leads 144 is to actuate a pulse generator which then actuates the marking stylus of a plotting device as will be described in more detail below in connection with Fig. 7. With contacts 39 open the impulses start to charge the above-mentioned condenser in integrator 38. The recorder pen 80 makes a record such, for example, as is indicated by curve 84 on downwardly moving chart 88 of the cumulative or integrated effect of the impulses received at the above-mentioned high quality condenser after removal of the short-circuit by the opening of the contacts 39. The indication increases continually as the "line," or reflected ray, 70 is traversed by detector 19, but it increases more slowly as the rate of the received impulses falls. When the rate falls below the threshold of the discriminator circuit 22, the back-setter 54, et cetera, is restored to its original position by the tension of spring 56, and contacts 39 again short-circuit and discharge the high quality condenser in integrator 38. The highest point of the curve 84 (i. e., the extreme right point of curve 84 as shown in Fig. 3), the point just before the fall, represents the integrated intensity of the reflection detected. The calibration is intentionally made non-linear. A substantially logarithmic representation is usually preferable and is approximated by proper design of the constants of the integrating circuit, in accordance with principles well known to those skilled in the art. Alternatively, a linear integrator can be used and its output introduced through a logarithmic potentiometer to the recorder circuit.

The potentiometer 35 has an appropriate direct current voltage difference between opposite points 33 and 34, derived from potentiometer 76, across which is shunted a direct current source 74. As shown in Fig. 3, point 34 is connected to one end of potentiometer 76 and point 33 is connected to the adjustable contacting arm 78 of the potentiometer. The potential difference between point 33 and the rotating contacting arm 36 of potentiometer 35, varies from zero to maximum and then back to zero in a linear way as the shaft 17 carrying the arm 36 turns. This potential difference actuates pen 82 through winding 37 and can be adjusted by potentiometer 76, 78 to provide an appropriate maximum amplitude (measured laterally) of the indications 86 on the downwardly moving chart 88 of recorder 85. When the crystal is turning at its "fast" rotational rate the pen 82 makes a continuous series of simple sawteeth 86, each having the form of an isosceles triangle. Each complete tooth 86 represents, for the specific arrangement of gears described by way of example, above, a complete turn of 360 degrees for the crystal and an increase in the Bragg reflection angle $\theta$ of one degree. Whenever a "line" is being recorded the diffractometer is in "slow" drive and pen 82 moves so slowly that its trace 81 is almost parallel to the time axis (the vertical edge of the downwardly moving recorder tape 88 as shown in Fig. 3). We are interested in the fraction of a crystal turn, i. e., the angle $\omega$ within a particular turn of the crystal, only when a line is being recorded, at which time the value of the angle $\omega$ is easy to read, as will presently become apparent.

These matters will be more readily perceived in connection with the larger scale record of a group of "lines" or reflections, from a quartz (hexagonal) crystal specimen, shown in Fig. 4. The diffractometer is set at $\theta=0$, $\omega=0$, the starting point is marked and the apparatus is set in motion. There is no reflection until $\theta$ is nearly 9.5 degrees (X-ray detector angle 19 degrees) when the identical regular sawteeth, marking one through nine degrees of $\theta$ (teeth 2 through 5, inclusive, are omitted in the "break" required by space limitations) scale A, are interrupted by the injection of a number of sections of substantially horizontal line (as shown in Fig. 4) these horizontal sections representing intervals during which the recording at slow speed of the group of detected reflections, occurring between nine and twelve degrees of the angle $\theta$, per scale A, is being effected.

Examining in detail the record shown in Fig. 4 for the reflections $a$ through $l$, inclusive, the following is evident.

Reflection $a$ occurred at the junction of portions 400 and 401 of the tenth "sawtooth," i. e., during the first half of the tenth complete specimen crystal turn. The crystal angle $\omega$ within that turn is therefore read from scale B at the left of Fig. 4. Flat portion 401, representing the slow speed scanning operation for recording reflection $a$, therefore occurred at a crystal angle $\omega$ of substantially 150 degrees.

When the recording of indication $a$ was completed, the fast speed scan was resumed (briefly) the left side of the tenth sawtooth pulse being completed and the rgiht side being started, as shown by the pointed portion 402, at the end of which fast scan a reflection $b$ over-rode the threshold of the discriminator circuit 22 and the slow speed scanning of reflection $b$, line 403 commenced.

Since this occurred during the second half of the tenth pulse the crystal angle $\omega$ within the tenth turn is read from scale C at the right of Fig. 4 and is found to be substantially 210 degrees.

At the completion of the recording of pulse $b$, the fast speed scan was resumed (briefly) producing portion 404 of the second half of pulse ten, until receipt of reflection $c$ again initiated the slow speed scan resulting in substantially horizontal portion 405 for which the angle $\omega$ of the specimen crystal within the tenth turn is read from scale C as substantially 270 degrees.

In similar fashion, portion 406 represents a fast scanning interval between the completion of the recording of reflection $c$ and the initiation of the slow scan for recording reflection $d$ represented by portion 407 for which the angle $\omega$, still within the tenth turn is substantially 330 degrees.

The peak 408 represents the completion of the tenth turn and the start of the eleventh turn accomplished at the fast scanning speed between the completion of the recording of pulse $d$ and the start of the recording of pulse $e$.

Portion 409 represents the slow speed recording of pulse $e$ which, obviously, occurs during the first half of pulse eleven. The angle $\omega$ of the specimen crystal within the eleventh turn is accordingly read from scale B and is substantially 30 degrees.

Similarly, reflections $f$, $g$, $h$, $i$, and $j$ occurred at specimen crystal angles $\omega$ within the eleventh turn of substantially 90, 150, 210, 270, and 330 degrees, respectively, and reflections $k$ and $l$ ocurred at specimen crystal angles of substantially 30 and 90 degrees, respectively, within turn twelve of the crystal.

As a practical expedient scales B and C may also be inscribed on a separate card so that they may be placed immediately adjacent the "sawtooth" irregularity for which the angle $\omega$ is to be determined.

Twelve reflections designated by the small letters $a$ through $l$, inclusive, are found in a group in this instance since a hexagonal form of crystal specimen was being rotated about its axis of hexagonal symmetry and a detector aperture of two degrees of angle $\theta$ was employed. For each of two successive complete crystal turns, therefore, six reflections spaced 60 degrees apart were detected in each full turn. The integrated intensity of the twelfth reflection $l$ was greatly reduced since only a portion of it succeeded in entering the aperture or opening of the X-ray detector before the latter was turned out of alignment with the reflected ray.

After the last reflection in the group $a$ through $l$, namely reflection $l$, the regular sawteeth continue uninterruptedly through the tooth corresponding to 17 degrees of $\theta$, or 17 complete turns of the specimen crystal, scale A. During the first half of the eighteenth turn a reflection $m$ is encountered and the process described in detail above is repeated until all reflections or groups of reflections in the level have been recorded.

In general the integrated quantitative intensity of the reflections in successive groups of reflections may vary considerably from group to group and accurate knowledge of the integrated relative intensities of all the reflections occurring is extremely valuable since it enables one skilled in the art of crystallography to deduce much more information concerning the probable arrangements of atoms, ions and/or molecules in the crystal structure than can possibly be deduced from the inaccurate and doubtful estimates of intensity and relative intensity obtained by prior art methods.

*Undistorted reciprocal lattice plotter*

The plotter, the salient features of which are indicated diagrammatically in Fig. 5, as one of its functions, graphically performs the arithmetic involved in solving the Equation 2, above, when rewritten as:

$$\epsilon = \omega' - \theta \qquad (5)$$

where $\omega'$ is the total number of degrees in the number of complete crystal turns and any fraction of a turn at which the particular reflection occurs. Here, however (with the gear ratios assumed above)

$$\theta = \frac{\omega'}{360}$$

so that $$\epsilon = \omega'\left(1 - \frac{1}{360}\right) = \omega'\left(\frac{359}{360}\right) \qquad (6)$$

A drive shaft 501 in the plotter of Fig. 5 is turned once for each turn of the crystal, i. e., it can be turned manually or it can be driven directly by shaft 17 of Fig. 3 through unity ratio gears or otherwise as may prove most convenient. A gear system, comprising a pair of beveled gears 502 and 550 and a pair of simple gears 503 and 504, for the gear ratios assumed for Fig. 3, causes a turntable 506 to turn 360 times for each 361 turns of the drive shaft 501. Thus the turntable of the plotting mechanism is rotated in accordance with the value of the angle $\epsilon$.

To be meticulously precise, in accordance with Equation 6, the drive ratio should be 359 to 360. However, 359 is not factorable and gears with such a large number of teeth as 359 are not practical. The drive ratio 360 to 361 is factorable into 18 times 20 to 19 times 10 and hence can be compounded with small gears. Since $$\frac{360}{359} = 1.002785 \text{ while } \frac{361}{360} = 1.002778$$

it is apparent that the difference is negligible for all practical purposes.

The turntable 506 carries a removable paper disk 507 on which the transcription of the data recorded by the diffractometer illustrated in Fig. 3 is to be made in reciprocal lattice form, for each single level measured. A blank paper disk 507 is secured on the turntable prior to plotting the data for each level. An index mark 511 is placed on each paper disk and is aligned, prior to starting the plot, with a definite reference position, such as the right edge of finger 523, when the stylus 525 is directly over the center point 505 of the turntable. This, obviously, enables the lattice plots for the several levels to be properly oriented with respect to each other. The drive shaft 501 carries a drum 508 the cylindrical periphery of which is graduated in five degree intervals to facilitate reading fractional parts of a full turn, i. e., to facilitate reading the angle $\omega$. A handle 509 is provided, by which the drum 508 and shaft 501 can be turned manually if desired in accordance with the turns data provided by a diffractometer of the type, for example, illustrated in Fig. 3 and described above.

As mentioned above, a polar plot of $$\frac{2}{\lambda} \sin \theta \text{ versus the angle } \epsilon$$

for each reflection constitutes a reciprocal lattice of the crystal specimen being tested which can, in many instances, be immediately indexed. Consequently the plotter need, as a second function, only supply a reference point that moves away from the center of the turntable by an amount proportional to $$\sin \theta = \sin \frac{\omega'}{360}$$

To accomplish this there is provided in the "plotter" of Fig. 5, a worm 510, fixed on shaft 501, which worm turns gear 512 on shaft 516. Arm 514 is keyed to shaft 516 by key 515. Shaft 516 is thus turned a quarter turn for each ninety turns of the shaft 501 and the drum 508 (for data recorded by the arrangement of Fig. 3 as above described). Hence pin 521, in the upper end of arm 514, moves from its starting position (arm 514 horizontal) with a vertical motion equal to the effective length L of arm 514 times sin $\theta$. The Scotch yoke 518, having slot 520 therein, transmits this vertical motion to the member 522, which is constrained to move vertically by the fixed guide members 526 and 552. The finger portion 523 of member 522 carries a marking member 524 having a centrally located stylus 525 which moves from the center point 505 upward along the vertical center line of turntable 506, under control of the mechanism just described in detail above. The marking member 524 can comprise, for example, a solenoid, having terminals 554 and 556, which can be energized by an electrical impulse at the proper moment when an indication should be recorded on paper disk 507 and cause stylus 525 to make the desired mark. Alternatively, stylus 525 can be manually depressed at the proper setting of drum 508 and counter 530 when data is being manually introduced into the plotting mechanism.

To recapitulate, in the starting position (arm 514 horizontal) the stylus 525 of the marking member 524 is immediately over point 505 at the center of the turntable. As the shaft 501 and the drum 508 are turned through an angle $\omega'$ the stylus is moved upwards by an amount $$L \sin \frac{\omega'}{360}$$

For the zero level, the distance L from pin 521 to shaft 516 is conveniently made ten centimeters. In general it should be of about the same order of magnitude as the radius of the turntable 506. As will be described hereinunder, the maximum radius of the zero level reciprocal lattice plot, corresponding to the length L, represents an arbitrary constant times the reciprocal of the wavelength $\lambda$ of the exploratory X-ray beam employed. The maximum radius or distance L is chosen to provide a lattice plot of convenient size. Other levels are recorded as will be described hereinunder, see section entitled "Obtaining Other Than Zero Levels," similarly to the equi-inclination Weissenberg method described in chapter 14 of "X-ray Crystallography" by Buerger, supra, starting at page 252. The distance L is shortened for levels other than the zero level, in proportion to cos $\mu$, where $\mu$ is the level setting angle (see subsequent section and Buerger, supra). With this precaution all levels are plotted to the same scale. The arm 514 is conveniently made adjustable in length by employing any of the numerous well known sliding two piece arrangements for such an arm, one suitable construction being indicated in Fig. 5 wherein one piece 540 is of a lipped channel shape and the other piece 542 slides in the channel of piece 540. One piece 540 can conveniently have a calibrated scale 546 engraved thereon and an index mark 544 is engraved on the other piece 542 to facilitate the adjustment of the length L to the required value for any level setting angle $\mu$ which may be required. Suitable clamping screws 548 can, of course, be provided, as indicated, to hold the arm at the desired adjusted length.

Worm 528 on shaft 501 drives worm gear 530 which serves as a turn counter. It is preferably graduated from 0 to 90 turns, as shown, so that one can read the number of "crystal turns" at a glance. Ninety turns of shaft 501 are required to cause gear 530 to complete one turn.

In Fig. 6 is shown a plot of the data for a quartz crystal specimen transcribed from the record of which the data shown in Fig. 4 is a part. The reciprocal lattice of Fig. 6, for the quartz crystal specimen described above, turns out to be a plurality of indications at the intersections of two sets of parallel lines inclined with respect to each other to form a plurality of like parallelograms each having two angles of 60 degrees each and two angles of 120 degrees each. Two indications appear at each intersections since, as explained in detail above, each reflection is scanned and recorded twice. The second indication in each instance is at a slightly greater distance from the center point of the lattice since it is recorded during the next successive crystal turn after its corresponding first indication was recorded. The fractions of a turn of the crystal are read from the data chart as described in detail above.

When the first few points of the zero level have been plotted a tentative choice of axes can be made. If the cell is primitive, as for the quartz crystal specimen described above, the shortest translations can be immediately taken as the axes of the reciprocal cell. If the cell is centered (i. e., if it has an atom, ion or molecule in the center of the cell or in the center of one or all of the cell faces) it may not be possible to definitely determine whether or not the cell is primitive until the reciprocal lattice plot of level one is taken and compared with that of the zero level. A proper choice of axes and the indexing of all the reflections can then properly be completed. For example, if the reciprocal lattice plot of the level one is identical with that of the zero level the cell is primitive. If, however, the innermost spots of the lattice of level one appear to indicate a central cell one half the size indicated by the zero level plot, a centered cell is indicated. The determination of the unit cell, the construction of the reciprocal lattice for each level and the indexing of each point on each lattice are effected in accordance with principles well known to those skilled in the art. (See, for example, chapters 21 and 22 of Buerger, supra.) Appropriate index marks have, for example, been placed, in accordance with standard procedure, adjacent a plurality of the indications on the zero level reciprocal lattice of Fig. 6 for the quartz crystal specimen described above. An additional set of marks indicating the recorded integrated intensity of each reflection can, obviously, also be placed adjacent the indications on the reciprocal lattice to assist the skilled crystallographer in interpreting the crystal structure indicated by the lattice.

Obtaining other than zero levels

While the zero level of a crystal is being run an approximate hemi-cylinder of film 132 (Fig. 3) in a light-tight, black paper envelope is secured, in holder 130 on pedestal 134, immediately below the crystal, as described hereinabove, and is thereby exposed to downwardly reflected X-rays. This produces an ordinary rotation photograph, used, as in the Weissenberg photographic recording method to determine the layer line settings for subsequent levels. By the time the full set of zero level readings have been completed the piece of film can be removed and developed and the proper angles for other levels can be determined, i. e., the angular settings for the diffractometer head and the X-ray detector settings for level 1, level 2, et cetera, in accordance with principles well know in this art. A layer line deviated longitudinally from the direct X-ray beam line by an amount $y$ on the section of film 132, which during exposure to the reflected X-rays was bent into a radius $r$ requires, for equi-inclination recording, that the angle $\mu$ be determined from the following equation $$\sin \mu = \frac{y}{2\sqrt{r^2+y^2}} \qquad (7)$$

To set the apparatus for recording reflections from a particular level, the diffractometer is turned through the appropriate angle $\mu$, about the axis 72 of Fig. 3, i. e. the vertical axis through the center of the specimen crystal. The X-ray detector 19 is then moved along support 62 to cause it to turn through an additional angle $\mu$, of the same value. The aperture of the X-ray detector is also closed to an opening smaller by the ratio of the quantity $\cos \mu$ and the apparatus is then ready to record this level. In plotting this level, the arm length L is set to $L=10 \cos \mu$ cms. and the level will then be plotted to the same scale as the zero level was plotted with a value of $L=10$ cms.

Aperture size

If the X-ray detector aperture is adjusted to a size such that scanning is effected with no overlap, some of the reflections may be split, a portion of the reflection being recorded on one crystal turn and another portion being recorded on the next successive turn, and it will then be necessary to determine the intensities of such reflections by adding together the two parts. If the gears are not perfect this addition may not produce an accurate intensity indication. In order to avoid this inconvenience and probable inaccuracy a 100 percent overlap is usually employed. This results in each reflection being covered twice, and hence it will be fully covered in a single pass as least once. Only one full line for each reflection is then used to obtain the integrated intensity and the second line and the partial reflections of any line can be disregarded. This double recording requires, as has been noted hereinabove, an X-ray detector aperture four times the $\theta$ equivalent of one turn of the crystal, so that, as is also noted above, in the case of the diffractometer of Fig. 3, the aperture opening required is four degrees.

Limitations on cell size

The larger the unit cell of the crystal the smaller the angle between successive reflections. If this angle is not greater than $\delta/2$ (where $\delta$ is the angular aperture of the X-ray detector) the corresponding lines are not resolved, i. e., they are not separately recorded. (The factor 1/2 is introduced to take into account the angle doubling in reflection.) Consider a plotter chart (reciprocal lattice) of zero level. The largest radius represents $1/\lambda$. If T is the smallest distance on the chart between points representing successive reflections, the angle between these is never smaller than $\Delta \omega$ where:

$$\sin \frac{\Delta \omega}{2} \frac{T/2}{1/\lambda} \text{ or } \Delta \omega = 2 \sin^{-1} \frac{T/2}{1/\lambda} \qquad (8)$$

But $\Delta$ must be larger than $\delta/2$, hence $$T > 2/\lambda \sin \delta/4 \qquad (9)$$

But $$T = \frac{1}{d_m}$$

where $d_m$ is the maximum interplaner spacing in the level. Hence $$d_m < \frac{\lambda}{2 \sin \delta/4}$$

For the apparatus described, used with copper radiation $=4°$, $\lambda 1.54$ A., hence $d_m < 44$ A. For a face centered crystal this means a cell of maximum edge of 88 A. while for a body centered cell the maximum cell edge is $44\sqrt{2}$ A.$=62$ A.

For larger cells we may use longer wavelengths or other gear ratios of the diffractometer. If we go to a higher drive ratio, say 360 to 1 for the diffractometer so that a turn of the crystal means an increase in $\theta$ of one half degree we must also, of course, correspondingly change the gears in the plotter. The plotter ratio instead of 359:360 should then, obviously, be 719:720. However 719 has no factors so again we use an approximation 720:721=36 times 20:7 times 103.

The drive ratio 540:1, where one crystal turn means one third degree increase in $\theta$, requires a plotter drive 1079:1080. This is factorable as 13 times 83:27 times 40.

Changing the diffractometer to another drive ratio, for example, from 180:1 drive to 360:1 drive, merely requires exchanging one set of commercially available gears for another. A corresponding gear change must, obviously, also be made in the plotter to plot the corresponding reciprocal lattice.

The diagram of Fig. 7 illustrates a combination of a diffractometer of the invention with a plotter of the invention to provide a completely automatic system which will automatically record the angles $\omega$ and $\theta$, the integrated intensities of all reflections and an undistorted reciprocal lattice for the level being recorded.

The diffractometer 700 can be, for example, that illustrated in Fig. 3 described hereinabove and the plotter 702 can be that illustrated in Fig. 5 also described hereinabove. The mechanical drive 704 can conveniently comprise a shaft geared by unity ratio gears to both shaft 17 of the above mentioned diffractometer and shaft 501 of the above mentioned plotter. Pulse generator 708 can be energized by a circuit 706 connected to the contacts 142 through leads 144 of the microswitch on the back-setting mechanism (see Fig. 3) of the diffractometer 700 so that at the end of the recording of the integrated intensity of each reflection pulse generator 708 sends an energy pulse over circuit 710 to the solenoid of marking member 524 of the plotter to cause stylus 525 to be depressed and make a mark on the paper disk 507 of the plotter. Thus an undistorted reciprocal lattice plot of each level will be automatically made during the recording of the reflection and angle data by the diffractometer.

Numerous and varied similar arrangements and rearrangements of diffractometers and reciprocal lattice plotters and combinations of the two within the spirit and scope of the principles of the present invention may obviously be readily made by those skilled in the art.

What is claimed is:

1. A diffractometer including means for continuously rotating a specimen about a predetermined axis, means for rotating a reflection detector about the said axis at a small fraction of the rotational rate of said specimen, means for initially aligning said specimen and said detector at a common "zero" angle position and means for recording the total angular rotation of said specimen and each reflection detected by said detector along a common time scale whereby the exact angular positions of the specimen and the detector for each reflection recorded can be accurately determined.

2. An undistorted reciprocal lattice plotter for plotting the data obtained by the diffractometer of claim 1, said plotter including means for rotating a chart through an angle representing the difference between the angular rotation of the specimen and that of the detector, means for moving a marking member along a straight line starting above the center point of rotation of said chart and extending radially above and parallel with said chart, the motion of the said member being proportional to the sine of one half the angle through which the detector is rotated and means for actuating said marking member to make a mark on said chart whenever the angular position of the specimen corresponds to that at which the record of a reflection is completed.

3. In combination, a first means for individually detecting specific discrete phenomena involving the directive radiation of energy, means for rapidly scanning with said first means a domain including such discrete phenomena, means responsive to the detection of a said phenomenon for simultaneously reducing substantially the scanning speed and back-setting the scanned domain by an amount exceeding the width over which said phenomena are detectable by said detecting means, means for maintaining said scanning means at said reduced rate during the scanning of the detected phenomenon, and means responsive to the completion of the scanning of said phenomenon for reestablishing the rapid scanning rate and the original position of the scanned domain relative to the scanning means.

4. An arrangement for investigating the diffractive properties of a specimen, said arrangement comprising means for generating a narrow energy beam, means for supporting said specimen in the path of said beam, means for substantially isolating and individually detecting each reflection of said beam from said specimen, means for rotating said specimen about a predetermined axis, transverse to said beam, means for rotating said detecting means about the said predetermined axis in a predetermined path, means for controlling the relative rotational speeds of said specimen and said detecting means, means for reducing by a common factor the rotational speeds of said specimen and said detecting means in response to the receipt of a reflection by said detecting means, and means for re-establishing the original rotational speeds of said specimen and said detector when the arc through which the reflection is received has been passed.

5. The arrangement of claim 4 and means for simultaneously recording to a time scale the angular positions of said specimen and said detector and the intensity of each received reflection, the latter indications being associated by their positioning on the record with the specimen and detector rotations at which each of the reflections were detected.

6. The arrangement of claim 5 and means for integrating the intensity of each detected reflection, said last stated means being interposed between said detecting means and said intensity recording means.

7. An X-ray diffractometer which includes means for directing an exploratory narrow angle X-ray beam along a predetermined reference direction or axis, means for holding a crystal specimen transversely on said axis, means for substantially isolating and detecting individual reflections of said narrow angle X-ray beam from said crystal, means for maintaining said detecting means directed toward said crystal and slowly rotating said detecting means in a predetermined path with respect to said reference axis and about said crystal through an arc of substantially 180 degrees, means for continuously rotating said crystal about an axis transverse to said reference axis at an angular rotation of 180 times the angular rotation of said detecting means, means responsive to the receipt of a reflection by said detecting means for substantially decreasing by a common factor the angular rotation rates of said detecting means and said crystal rotating means, means for simultaneously back-setting said crystal by an angle of several degrees, means for locking said apparatus in said reduced speed condition to slowly scan through the angle of said detected reflection and means responsive to the completion of the scanning of said detected reflection for restoring the initial setting of the crystal and the initial rotational rates of said detecting and crystal rotating means until the next subsequent reflection is detected.

8. A diffractometer, including means for slowly rotating a narrow-aperture reflection detecting means through an arc about a test specimen, means for projecting a narrow beam of X-rays to impinge upon said specimen, means for rotating said specimen at a rate a predetermined large number of times as fast as the rotation of said detecting means, means for initially aligning said test specimen and said detecting means at a common "zero" angle position, means responsive to the detection of a reflection from said test specimen for decreasing the rotational rates of said detecting means and said specimen by a common large factor, means for simultaneously back-setting said specimen by an angle of several degrees, means for locking in said slow rotational rates for the duration of the scanning of said detected reflection, means responsive to the completion of the scanning of said reflection for re-establishing the original setting of said specimen and the original rotational rates of said detecting means and of said specimen, respectively, until the next subsequent reflection is received and means for permanently recording to a time scale, in correlated form, reflection intensity versus the angular rotations of both the detecting means and the test specimen.

9. An X-ray diffractometer comprising means for generating a narrow X-ray beam, means for supporting and rotating a specimen crystal in the path of said beam, means for separately detecting individual reflections of said X-ray beam from said specimen crystal, means for rotating said detecting means in an arc about said crystal, means for correlating the rotations of said crystal and said detecting means, a first means for continuously recording the instantaneous angular positions of said crystal and of said detecting means, and a second means for recording reflections detected by said detecting means in juxtaposition to the record of said instantaneous angular positions of said crystal and of said detecting means.

10. The combination of claim 9 and means responsive to the detection of a reflection by said detecting means to substantially decrease the rotation speeds of said specimen and said detecting means and to simultaneously back-set said crystal by at least the maximum normal width in degrees of a reflection and further means responsive to the completion of the scanning of said reflection at said reduced speed to reestablish the original rotation speeds and reset the crystal forwardly by the amount of said back-set.

11. The combination of claim 10 in which said second recording means is coupled to said detecting means by means for integrating the intensity of each detected reflection.

12. A diffractometer for systematically determining the Bragg angles at which reflections are obtained from a crystal specimen for any level of said crystal specimen, said diffractometer including means for generating a sharply defined X-ray beam, means for supporting said crystal specimen transversely in said beam at any of a large range of angles with respect to said beam, means for detecting X-rays said means having a narrow angle aperture, means for rotating said specimen about an axis of said specimen, means for rotating said detecting means about the same axis, said last-mentioned means maintaining the aperture of said detecting device directed toward said specimen, means maintaining a predetermined ratio between the rotational speed of said crystal specimen and the rotational speed of said detecting means, means for establishing a common zero angle condition for both said specimen and said detecting device, means for generating a signal varying linearly and periodically between two limiting values with the rotation of said specimen and means for recording the linear variations of said signal on a time scale whereby the angular positions of both said specimen and said detecting means with respect to said common zero angle condition can be determined from said record for any instantaneous angular position of said specimen.

13. In an X-ray diffractometer, a specimen crystal, means for continuously rotating said specimen crystal about an axis of said crystal, a narrow aperture detecting means, means for continuously rotating said narrow aperture X-ray detecting means in an arc about the axis of rotation of said crystal, means for maintaining said detecting means aperture directed toward said crystal, means for initially setting said crystal and said detecting means both at a zero angle position, means for maintaining the angular rotation of said detecting means at a definite small fractional value of the angular rotation of said specimen crystal, means for generating a periodically varying signal the variations of which are synchronized with the rotation of said crystal, means for recording the variation of said signal on a time scale and means for simultaneously recording the output of said detecting means to the same time scale as said signal.

14. A polar plotting device for plotting an undistorted reciprocal lattice of a specimen crystal from diffractometer data representing the angular position of the normal to the deflecting plane and the corresponding Bragg angle of the reflection for each reflection detected, both with respect to a common reference zero angle, said plotting device comprising means for rotating a chart about a fixed reference point in accordance with the value of the said normal angle in degrees, means for moving a marking member from said fixed reference point along a fixed straight radial line above said chart in accordance with the sine of said Bragg angle multiplied by a fixed constant and means for actuating said marking member to make a mark on said chart for each combination of normal angular position and reflection Bragg angle corresponding to a reflection recorded in said diffractometer data.

15. In a diffractometer for determining the angles of all reflections for each level of a specimen the combination which comprises means for aligning the specimen and a reflecting detector in an initial "zero" angle relation for both the specimen and the detector, a first means for rotating the specimen about a predetermined axis at a relatively fast rate, a second means for rotating the detector about the same axis at a much slower rate said second rotating means being positively coupled to said first rotating means, and means for recording with reference to a time scale each and all turns of the specimen and simultaneously recording with reference to the same time scale reflections detected by said detector whereby the angular position of said detector for each reflection can be determined to a high degree of accuracy by reference to the recorded turns of the specimen.

16. The combination of claim 15 and means responsive to the detection of a reflection by said detector for reducing the rotational rates of said specimen and said detector by a large common factor, means for maintaining said reduced rotational rates during the recording of said detected reflection and means responsive to the completion of the recording of said detected reflection for reestablishing the original rotational rates of said specimen and said detector.

17. In combination an automatically recording diffractometer for determining and recording all Bragg angle reflections of a crystal specimen for each level of said specimen and an automatic plotting device for recording an undistorted reciprocal lattice for each level of said specimen concurrently with the operation of said diffractometer in determining the reflections for the level, said diffractometer comprising means for aligning the specimen and a reflection detector in an initial zero angle relation for both the specimen and the detector, a first means for rotating the specimen about a predetermined axis at a relatively fast rate, a second means for rotating the detector about the same axis at a much slower rate, said second rotating means being positively coupled to said first rotating means, means for recording with reference to a time scale each and all turns of the specimen and simultaneously recording with reference to the same time scale reflections detected by said detector, and means indicating the completion of the recording of each reflection, said plotting device comprising a third means for rotating a chart from an initial position of alignment, said third rotating means being directly coupled mechanically to the said first rotating means in said diffractometer for rotating said specimen, said third rotating means rotating said chart through an angle $\epsilon$ defined at any instant as the difference between the total rotation of the specimen in degrees from its initial zero position and the total rotation of the detector in degrees from its initial position, said plotting device further comprising a marking device including a marking member and means for moving said marking device in a straight line from an initial alignment in which said marking member is directly above the rotation center point of said rotating chart, the motion of said device along said straight line being at any instant equal to the sine of the angle through which the diffractometer detector has been rotated from its initial position multiplied by an arbitrary constant, said means for moving said marking member being also driven by said third rotating means, said marking device comprising electromechanical means for actuating said marking member to make a mark on said chart, said overall combination further including an energy pulse generating circuit connected to said marking device said circuit being connected to and actuated by the means indicating completion of the recording of each reflection in said diffractometer to generate an energy pulse, said pulse activating said marking device to cause the marking member to make a mark on said chart at the completion of the recording of each reflection by said diffractometer.

18. In combination an automatic recording diffractometer providing data based upon the continuous rotation of both the specimen being diffracted and a reflection detector from an initial common "zero" angle position, said diffractometer including a shaft on which the specimen is rotated and a pair of contacts which open during the recording of a reflection and close at the completion of the recording of each reflection, an automatic undistorted reciprocal lattice plotter driven from said specimen rotating shaft said plotter comprising means for rotating a chart in accordance with the difference between the rotations of said specimen and said detector and means for moving a marking device including a marking member in a straight line starting with the marking member directly above the point about which said chart is rotated the motion of said marking device being proportional to the sine of the angle through which the detecting device is turned multiplied by an arbitrary constant and means interconnected between said pair of contacts and said marking device said last stated means actuating said marking device to cause said marking member to mark said rotating chart each time said pair of contacts are closed.

(References on following page)

References Cited in the file of this patent

UNITED STATES PATENTS

| | | |
|---|---|---|
| 706,682 | Neubauer | Aug. 12, 1902 |
| 2,109,283 | Boykow | Feb. 22, 1938 |
| 2,383,764 | Bond | Aug. 28, 1945 |
| 2,386,785 | Friedman | Oct. 16, 1945 |
| 2,510,384 | Dehmel | June 6, 1950 |
| 2,619,600 | Hamacher | Nov. 25, 1952 |

FOREIGN PATENTS

| | | |
|---|---|---|
| 112,252 | Sweden | Oct. 31, 1944 |